(12) United States Patent
Nelluri et al.

(10) Patent No.: US 11,522,781 B1
(45) Date of Patent: Dec. 6, 2022

(54) SYSTEM FOR MONITORING A DISTRIBUTED NETWORK USING A NODE CRAWLER

(71) Applicant: BANK OF AMERICA CORPORATION, Charlotte, NC (US)

(72) Inventors: Govinda Rajulu Nelluri, Telangana (IN); Srinivasa Rao Dakshinyam, Hyderabad (IN); Meenakshi MeenakshiSundaram, Chennai (IN); Nithya C, Chennai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/697,026

(22) Filed: Mar. 17, 2022

(51) Int. Cl.
G06F 15/173 (2006.01)
H04L 43/12 (2022.01)
H04L 43/045 (2022.01)
H04L 43/10 (2022.01)
H04L 41/12 (2022.01)

(52) U.S. Cl.
CPC .............. *H04L 43/12* (2013.01); *H04L 41/12* (2013.01); *H04L 43/045* (2013.01); *H04L 43/10* (2013.01)

(58) Field of Classification Search
CPC ....... H04L 43/12; H04L 41/12; H04L 43/045; H04L 43/10
See application file for complete search history.

(56) References Cited

U.S. PATENT DOCUMENTS

| | | | |
|---|---|---|---|
| 10,460,367 B2 | 10/2019 | Kurian | |
| 10,540,653 B1 | 1/2020 | James et al. | |
| 10,635,801 B2 | 4/2020 | Tovey et al. | |
| 10,839,345 B2 | 11/2020 | Antor et al. | |
| 10,956,854 B2 | 3/2021 | Souder et al. | |
| 10,977,460 B2 | 4/2021 | Bandil et al. | |
| 11,062,256 B2 | 7/2021 | Bandil et al. | |
| 11,169,970 B2 | 11/2021 | Miller et al. | |
| 11,222,331 B2 | 1/2022 | Madisetti et al. | |
| 11,223,481 B2 | 1/2022 | Adluri | |
| 11,244,378 B2 | 2/2022 | Pannicke et al. | |
| 11,249,169 B2 | 2/2022 | Connors et al. | |
| 11,256,712 B2 | 2/2022 | Duraisamy Soundrapandian et al. | |
| 11,316,681 B2 | 4/2022 | Zhao | |
| 2003/0046390 A1* | 3/2003 | Ball | H04L 41/12 709/224 |
| 2014/0344015 A1 | 11/2014 | Puertolas-Montanes et al. | |
| 2015/0120567 A1 | 4/2015 | Van Rooyen et al. | |

(Continued)

*Primary Examiner* — Padma Mundur
(74) *Attorney, Agent, or Firm* — Moore & Van Allen PLLC; Anup Shrinivasan Iyer (57) ABSTRACT

Systems, computer program products, and methods are described herein for dynamic deployment of discerner nodes in a non-monitored distributed network. The present invention is configured to deploy the node crawler on the distributed network based on at least receiving the user input; determine, using the node crawler, node-level network behavior of the one or more nodes; determine that the node-level behavior of a first subset of nodes do not meet one or more security controls; generate a discerner node based on at least the node-level network behavior of the one or more nodes; deploy the discerner node on the first subset of nodes; and determine that the node-level behavior of the first subset of nodes meets the one or more security controls based on at least deploying the discerner node.

14 Claims, 4 Drawing Sheets

(56) References Cited

U.S. PATENT DOCUMENTS

| | | |
|---|---|---|
| 2019/0347627 A1 | 11/2019 | Lin et al. |
| 2020/0118117 A1 | 4/2020 | McManus et al. |
| 2020/0184465 A1 | 6/2020 | Kislev et al. |
| 2020/0201683 A1 | 6/2020 | Muskal et al. |
| 2020/0409825 A1* | 12/2020 | Balasubramanian ........................ G06F 11/302 |
| 2021/0351931 A1 | 11/2021 | Wang |

* cited by examiner

SYSTEM FOR MONITORING A DISTRIBUTED NETWORK USING A NODE CRAWLER

FIELD OF THE INVENTION

The present invention embraces a system for dynamic deployment of discerner nodes in a non-monitored distributed network.

BACKGROUND

Distributed ledger technology (DLT) is based on a decentralized model, in which peers collaborate and build trust over a business network. Each peer entity can be represented by one or more nodes and this network of nodes is used to broadcast interactions and reach consensus for each interaction submitted. Each node is supposed to be independent with the ability to serve any of the distributed applications and/or existing enterprise applications. However, the health of each node and the entire distributed ledger network needs to be monitored to ensure truly decentralized and robust operations and more importantly, adherence to any internal and/or external requirements. However, it is not uncommon for node-level behavior of some nodes within the distributed network to not be monitored.

Therefore, there is a need for a system for crawling through the distributed network to identify specific nodes whose node-level behaviors are not monitored, and deploy discerner nodes specifically to those identified nodes for monitoring and reporting node-level behaviors

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for dynamic deployment of discerner nodes in a non-monitored distributed network is presented. The system comprising: at least one non-transitory storage device; and at least one processor coupled to the at least one non-transitory storage device, wherein the at least one processor is configured to: electronically receive, from a user input device, a user input comprises instructions to deploy a node crawler on a distributed network, wherein the distributed network comprises one or more nodes; deploy the node crawler on the distributed network based on at least receiving the user input; determine, using the node crawler, node-level network behavior of the one or more nodes; determine that the node-level behavior of a first subset of nodes do not meet one or more security controls; generate a discerner node based on at least the node-level network behavior of the one or more nodes; deploy the discerner node on the first subset of nodes; and determine that the node-level behavior of the first subset of nodes meets the one or more security controls based on at least deploying the discerner node.

In some embodiments, the at least one processor is further configured to: determine, using the node crawler, a structure of the distributed network; and generate the discerner node based on at least the structure of the distributed network.

In some embodiments, the node-level network behavior comprises at least a monitoring status of node-level interactions associated with the one or more nodes.

In some embodiments, the monitoring status comprises at least active status or inactive status.

In some embodiments, the at least one processor is further configured to: determine a monitoring type associated with the monitoring status of the node-level interactions associated with a second subset nodes; determine that the monitoring type does not meet the one or more security controls; and deploy the discerner node on the second subset nodes.

In some embodiments, the at least one processor is further configured to: continuously monitor, using the discerner node, one or more interactions executed by the first subset of nodes; retrieve, using the discerner node, interaction information associated with the one or more interactions; and transmit control signals configured to cause a third party device to display the interaction information.

In some embodiments, the at least one processor is further configured to: retrieve, using the discerner node, the interaction information associated with the one or more interactions executed by the first subset of nodes; determine, based on at least the interaction information, that the one or more interactions executed by the first subset of nodes meets one or more requirements, wherein the one or more requirements comprises at least an internal requirement and an external requirement; and transmit control signals configured to cause the user input device to display a confirmation notification indicating that the one or more interactions executed by the first subset of nodes meets the one or more requirements.

In another aspect, a computer program product for dynamic deployment of discerner nodes in a non-monitored distributed network is presented. The computer program product comprising a non-transitory computer-readable medium comprising code causing a first apparatus to: electronically receive, from a user input device, a user input comprises instructions to deploy a node crawler on a distributed network, wherein the distributed network comprises one or more nodes; deploy the node crawler on the distributed network based on at least receiving the user input; determine, using the node crawler, node-level network behavior of the one or more nodes; determine that the node-level behavior of a first subset of nodes do not meet one or more security controls; generate a discerner node based on at least the node-level network behavior of the one or more nodes; deploy the discerner node on the first subset of nodes; and determine that the node-level behavior of the first subset of nodes meets the one or more security controls based on at least deploying the discerner node.

In yet another aspect, a method for dynamic deployment of discerner nodes in a non-monitored distributed network is presented. The method comprising: electronically receiving, from a user input device, a user input comprises instructions to deploy a node crawler on a distributed network, wherein the distributed network comprises one or more nodes; deploying the node crawler on the distributed network based on at least receiving the user input; determining, using the node crawler, node-level network behavior of the one or more nodes; determining that the node-level behavior of a first subset of nodes do not meet one or more security controls; generating a discerner node based on at least the node-level network behavior of the one or more nodes; deploying the discerner node on the first subset of nodes; and determining that the node-level behavior of the first subset of nodes meets the one or more security controls based on at least deploying the discerner node.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority, or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

As used herein, a "distributed ledger" may refer to a consensus of replicated and synchronized data geographically shared across multiple nodes on a network. Without using a centralized data storage, each distributed ledger database replicates and saves an identical copy of the ledger. A distributed ledger may employ executing codes, also known as smart contracts, to manage transactions and store records of transactions among disparate participants in the distributed ledger-based network (DLN) without the need for a central authority.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Distributed ledger technology (DLT) is based on a decentralized model, in which peers collaborate and build trust over a business network. Each peer entity can be represented by one or more nodes and this network of nodes is used to broadcast interactions and reach consensus for each interaction submitted. Each node is supposed to be independent with the ability to serve any of the distributed applications and/or existing enterprise applications. However, the health of each node and the entire distributed ledger network needs to be monitored to ensure truly decentralized and robust operations and more importantly, adherence to any internal and/or external requirements. However, it is not uncommon for node-level behavior of some nodes within the distributed network to not be monitored. Therefore, there is a need for a system for crawling through the distributed network to identify specific nodes whose node-level behaviors are not monitored, and deploy discerner nodes specifically to those identified nodes for monitoring and reporting node-level behaviors.

Figure 1:
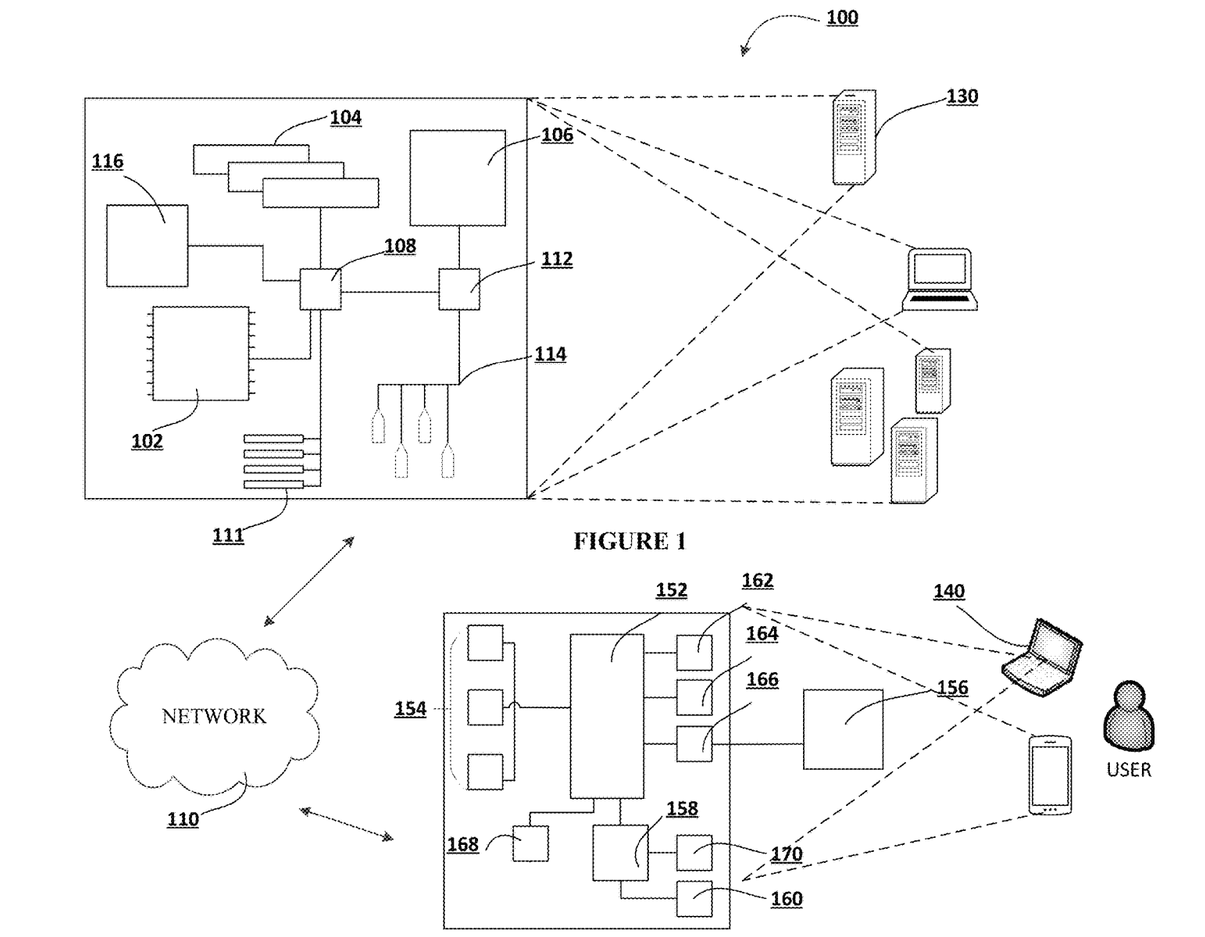
FIG. 1 illustrates technical components of a system for dynamic deployment of discerner nodes in a non-monitored distributed network, in accordance with an embodiment of the invention.

FIG. 1 illustrates technical components of a system for dynamic deployment of discerner nodes in a non-monitored distributed network 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input device 140. In some embodiments, the system 130, and the user input device 140 may be used to implement the processes described herein, in accordance with an embodiment of the present invention. In this regard, the system 130 and/or the user input device 140 may include one or more applications stored thereon that are configured to interact with one another to implement any one or more portions of the various user interfaces and/or process flow described herein. For purposes of this invention, the non-monitored distributed network has technological infrastructure and protocols that allows simultaneous access, validation, and record updating in an immutable manner across a network that's spread across multiple entities. In other words, the system environment 100 described herein may be configured to implement distributed ledger technology (DLT), a protocol that enables the secure functioning of a decentralized digital database.

In accordance with embodiments of the invention, the system 130 is intended to represent various forms of digital computers, such as laptops, desktops, video recorders, audio/video player, radio, workstations, servers, wearable devices, Internet-of-things devices, electronic kiosk devices (e.g., automated teller machine devices), blade servers, mainframes, or any combination of the aforementioned. In accordance with embodiments of the invention, the user input device 140 is intended to represent various forms of mobile devices, such as personal digital assistants, cellular telephones, smartphones, augmented reality (AR) devices, virtual reality (VR) devices, extended reality (XR) devices, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 as part of an application that may perform the functions disclosed herein, display graphical information for a GUI on an external input/output device, such as display 116 coupled to a high-speed interface 108, and/or the like. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multiprocessor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the network 110, a number of other computing devices (not shown) in addition to the user input device 140. In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1 also illustrates a user input device 140, in accordance with an embodiment of the invention. The user input device 140 includes a processor 152, memory 154, an input/output device such as a display 156, a communication interface 158, and a transceiver 160, among other components. The user input device 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input device 140, including instructions stored in the memory 154, which in one embodiment includes the instructions of an application that may perform the functions disclosed herein. The processor may be implemented as a chipset of chips that include separate and multiple analog and digital processors. The processor may be configured to provide, for example, for coordination of the other components of the user input device 140, such as control of user interfaces, applications run by user input device 140, and wireless communication by user input device 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input device 140 with other devices. External interface 168 may provide, for example, for wired communication in some implementations, or for wireless communication in other implementations, and multiple interfaces may also be used.

The memory 154 stores information within the user input device 140. The memory 154 can be implemented as one or more of a computer-readable medium or media, a volatile memory unit or units, or a non-volatile memory unit or units. Expansion memory may also be provided and connected to user input device 140 through an expansion interface (not shown), which may include, for example, a SIMM (Single In Line Memory Module) card interface. Such expansion memory may provide extra storage space for user input device 140 or may also store applications or other information therein. In some embodiments, expansion memory may include instructions to carry out or supplement the processes described above and may include secure information also. For example, expansion memory may be provided as a security module for user input device 140 and may be programmed with instructions that permit secure use of user input device 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input device 140 to transmit and/or receive information or commands to and from the system 130 via the network 110. Any communication between the system 130 and the user input device 140 (or any other computing devices) may be subject to an authentication protocol allowing the system 130 to maintain security by permitting only authenticated users (or processes) to access the protected resources of the system 130, which may include servers, databases, applications, and/or any of the components described herein. To this end, the system 130 may require the user (or process) to provide authentication credentials to determine whether the user (or process) is eligible to access the protected resources. Once the authentication credentials are validated and the user (or process) is authenticated, the system 130 may provide the user (or process) with permissioned access to the protected resources. Similarly, the user input device 140 (or any other computing devices) may provide the system 130 with permissioned to access the protected resources of the user input device 130 (or any other computing devices), which may include a GPS device, an image capturing component (e.g., camera), a microphone, a speaker, and/or any of the components described herein.

The user input device 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation- and location-related wireless data to user input device 140, which may be used as appropriate by applications running thereon, and in some embodiments, one or more applications operating on the system 130.

The user input device 140 may also communicate audibly using audio codec 162, which may receive spoken information from a user and convert it to usable digital information. Audio codec 162 may likewise generate audible sound for a user, such as through a speaker, e.g., in a handset of user input device 140. Such sound may include sound from voice telephone calls, may include recorded sound (e.g., voice messages, music files, etc.) and may also include sound generated by one or more applications operating on the user input device 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a technical environment that includes a back end component (e.g., as a data server), that includes a middleware component (e.g., an application server), that includes a front end component (e.g., a client computer having a graphical user interface or a Web browser through which a user can interact with an implementation of the systems and techniques described here), or any combination of such back end, middleware, or front end components.

As shown in FIG. 1, the components of the system 130 and the user input device 140 are interconnected using the network 110. The network 110, which may be include one or more separate networks, be a form of digital communication network such as a telecommunication network, a local area network ("LAN"), a wide area network ("WAN"), a global area network ("GAN"), the Internet, or any combination of the foregoing. It will also be understood that the network 110 may be secure and/or unsecure and may also include wireless and/or wired and/or optical interconnection technology.

In accordance with embodiments of the invention, the components of the system environment 100, such as the system 130 and the user input device 140 may have a client-server relationship, where the user input device 130 makes a service request to the system 130, the system 130 accepts the service request, processes the service request, and returns the requested information to the user input device 140, and vice versa. This relationship of client and server typically arises by virtue of computer programs running on the respective computers and having a client-server relationship to each other.

It will be understood that the embodiment of the system environment 100 illustrated in FIG. 1 is exemplary and that other embodiments may vary. As another example, in some embodiments, the system environment may include more, fewer, or different components. As another example, in some embodiments, some or all of the portions of the system environment 100 may be combined into a single portion. Likewise, in some embodiments, some, or all of the portions of the system 130 may be separated into two or more distinct portions.

Figure 2:
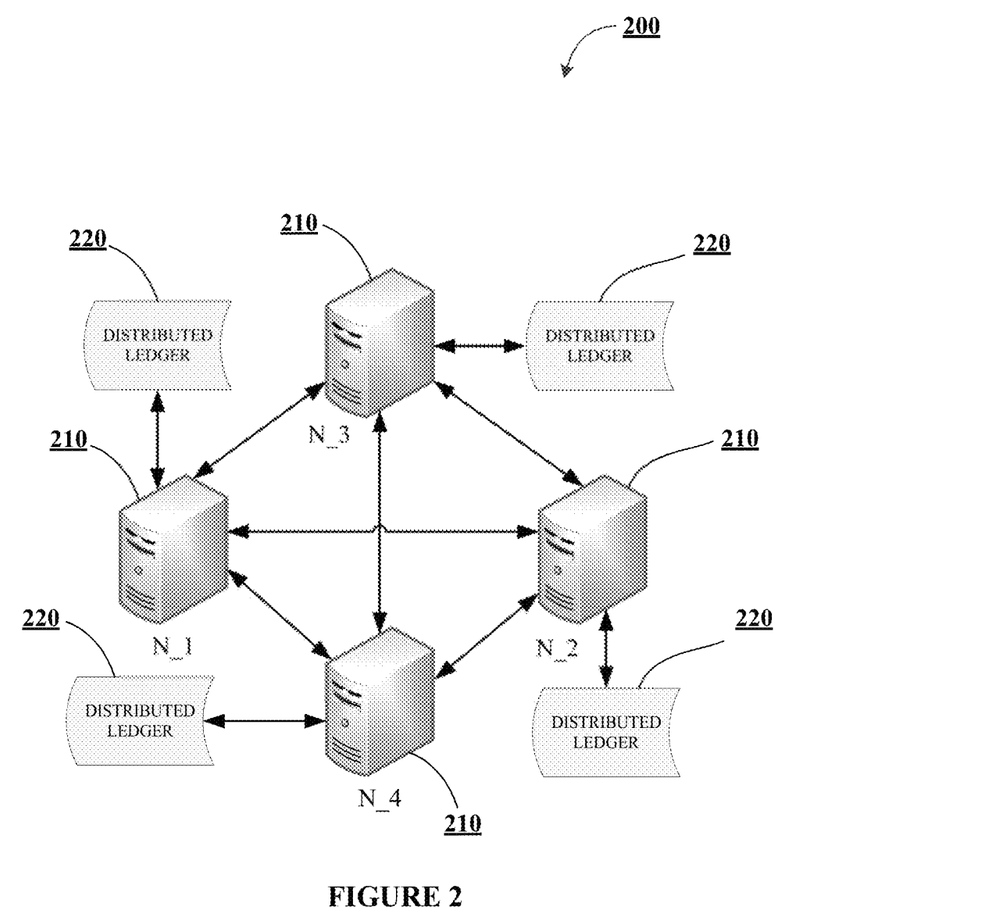
FIG. 2 illustrates a process flow for dynamic deployment of discerner nodes in a non-monitored distributed network, in accordance with an embodiment of the invention.

FIG. 2 illustrates a decentralized distributed network configuration 200, in accordance with embodiments of the invention. As described herein, technological infrastructure (e.g., the system environment 100) with DLT capability allow simultaneous access, validation, and recording of transactions between two or more nodes. These nodes may include networked devices such as system 130, user input device 140 that are capable of performing the various tasks required by the DLT protocols. As shown in FIG. 2, the distributed network is decentralized—meaning that a distributed ledger 220 (i.e., a decentralized ledger) is maintained on multiple nodes (N_1, N_2, N_3, and N_4) 210 of the distributed network. One node in the distributed network may have a complete or partial copy of the entire ledger or set of interactions and/or transaction object on the distributed ledger chain. Interactions are initiated at a node of the distributed network and communicated to the various nodes of the distributed network. Any of the nodes can validate an interaction, add the transaction to its copy of the distributed ledger, and/or broadcast the interaction, its validation (in the form of a transaction object) and/or other data to other nodes.

Various other specific-purpose implementations of distributed networks have been developed. These include distributed domain name management, decentralized crowd-funding, synchronous/asynchronous communication, decentralized real-time ride sharing and even a general purpose deployment of decentralized applications. In some embodiments, a distributed networks may be characterized as a public distributed network, a consortium distributed network, or a private distributed network. In this regard, the public distributed network is a distributed network that anyone in the world can read, anyone in the world can send transactions to and expect to see them included if they are valid, and anyone in the world can participate in the consensus process. The consensus process is a process for determining which of the transaction objects get added to the chain and what the current state each transaction object is. Typically, public distributed networks are secured by crypto economics—the combination of economic opportunities and cryptographic verification using mechanisms such as proof of work, following a general principle that the degree to which someone can have an influence in the consensus process is proportional to the quantity of economic resources that they can bring to bear. A public distributed network is generally considered to be fully decentralized.

In some embodiments, a consortium distributed network is a distributed network where the consensus process is controlled by a pre-selected set of nodes; for example, a distributed network may be associated with a number of member institutions (say 15), each of which operate in such a way that the at least 10 members must sign every transaction object in order for the block to be valid. The right to read such a transaction object chain may be public or restricted to the participants. These distributed networks may be considered partially decentralized.

In still other embodiments, fully private distributed network is a distributed network whereby permissions are kept centralized with one entity. The permissions may be public or restricted to an arbitrary extent.

Figure 3:
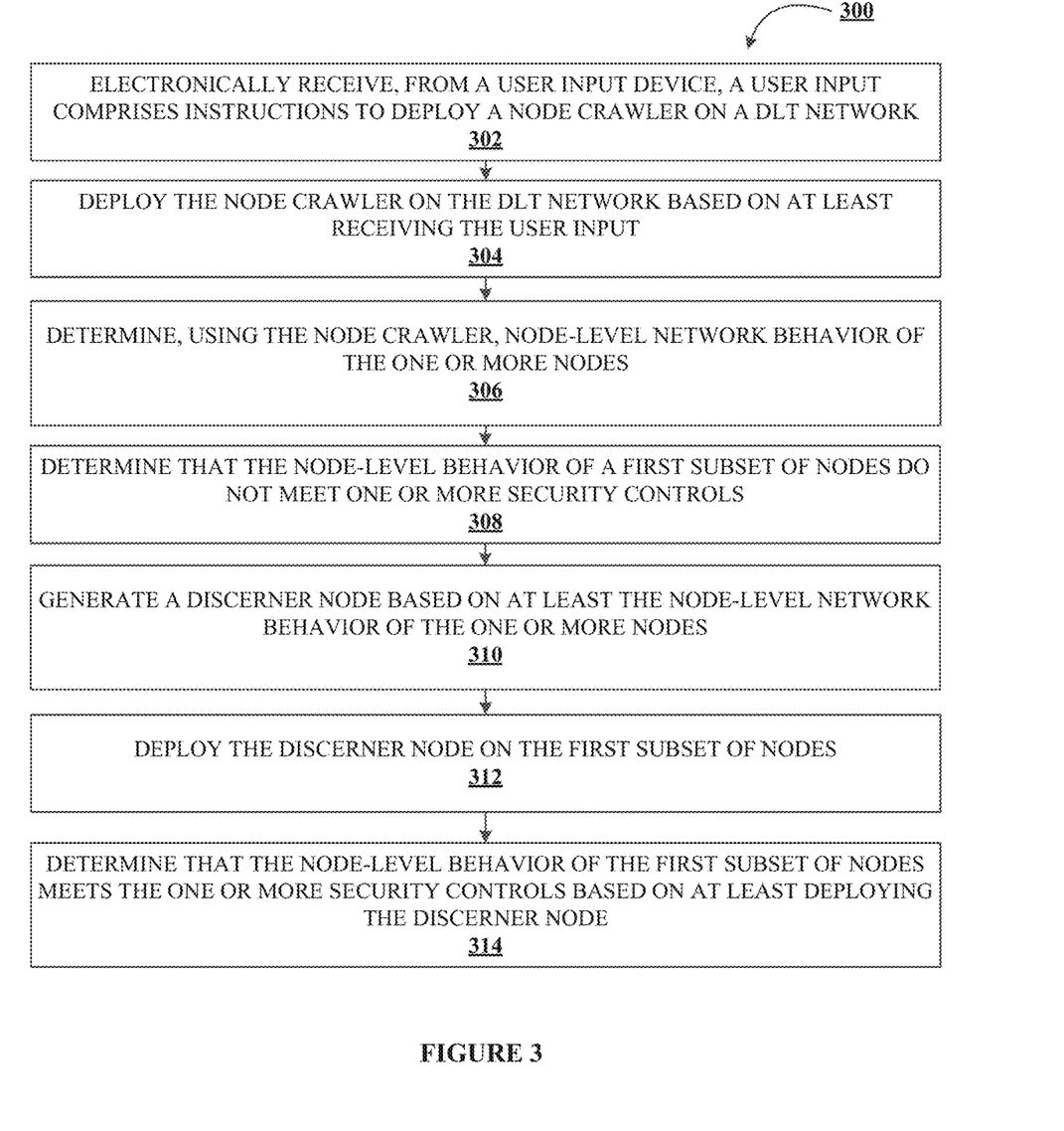
FIG. 3 illustrates a decentralized distributed network configuration, in accordance with embodiments of the invention.

FIG. 3 illustrates a process flow for dynamic deployment of discerner nodes in a non-monitored distributed network 300, in accordance with embodiments of the invention. As shown in block 302, the process flow includes electronically receiving, from a user input device, a user input comprises instructions to deploy a node crawler on a distributed network. Next, as shown in block 304, the process flow includes deploying the node crawler on the distributed network based on at least receiving the user input. In some embodiments, the node crawler may systematically traverse the distributed network to identify the number of nodes in the distributed network.

Next, as shown in block 306, the process flow includes determining, using the node crawler, node-level network behavior of the one or more nodes. In this regard, the node crawler may collect and analyze internal network data related to node-level behavior. In some embodiments, the node crawler may be used to bolster network safety by watching traffic and observing unusual activity and departures of a network operation. To this end, the node crawler may monitor the inside happenings of an active distributed network by collecting data from many data points and devices (e.g., nodes) to aid in a detailed offline analysis. As part of determining node-level behavior, the node crawler checks and accounts for change in bandwidth and protocol being used during interactions between nodes. The node crawler may be configured to continuously monitor the distributed network, marking known and unknown activities, new and unusual patterns and indicating potential issues identified.

In some embodiments, in addition to determining the node-level network behavior, the system may be configured to determine, using the node crawler, a structure of the distributed network. In this regard, the node crawler may determine a framework for the specification of a network's physical components and their functional organization and configuration, its operational principles and procedures, as well as communication protocols used.

Next, as shown in block 308, the process flow includes determining that the node-level behavior of a first subset of nodes do not meet one or more security controls. In some embodiments, the node-level behavior may include a monitoring status of node-level interactions of the one or more nodes. The monitoring status may indicate whether monitoring protocols are implemented and are active in the distributed network to monitor various node-level interactions between the one or more nodes. In some embodiments, the node-level behavior of the first subset of nodes do not meet the security controls if their node-level interactions are not adequately monitored.

In some embodiments, each node-level interaction may require a particular monitoring type, based on the type of interactions that occur between the nodes. To this end, each monitoring type may be associated with a specific set of monitoring protocols that are implemented at the node-level on a second subset of nodes. Even if the monitoring status is active, if the monitoring type, i.e., the monitoring protocols, are not adequate to satisfy the monitoring type, the system may be configured to determine that the node-level behavior of the second subset of nodes does not meet the requisite security controls.

Next, as shown in block 310, the process flow includes generating a discerner node based on at least the node-level network behavior of the one or more nodes. In some embodiments, the system may be configured to consider the structure of the distributed network when generating the discerner node. In some embodiments, the system may be configured to determine specific monitoring protocols to be implemented on the first subset of nodes to monitor node-level behavior. These monitoring protocols may vary depending on the type of behavior that requires monitoring and the specific requirements of security controls that need to be met. Accordingly, the system may be configured to generate the discerner node based on at least the identified monitoring protocols to monitor the node-level behavior of the first subset of nodes.

Next, as shown in block 312, the process flow includes deploying the discerner node on the first subset of nodes. As described herein, once the node crawler identifies that the node-level behavior of the first set of nodes does not meet the security controls, the system may be configured to deploy the discerner node on the first subset of nodes to specifically monitor their node-level behavior.

Next, as shown in block 314, the process flow includes determining that the node-level behavior of the first subset of nodes meets the one or more security controls based on at least deploying the discerner node. In some embodiments, the system may be configured to continuously monitor, using the discerner node, one or more interactions executed by the first subset of nodes. In response, the system may be configured to retrieve, using the discerner node, interaction information associated with the one or more interactions. Once retrieved, the system may be configured to transmit control signals configured to cause a third party device to display the interaction information. This interaction information may be used by the third party to determine whether the node-level behavior, i.e., the node-level interactions meet any internal and/or external requirements.

In some embodiments, the system may be configured to initiate a dynamic requirements assessment engine to determine whether the node-level interaction meets the internal and/or external requirements. In this regard, the system may be configured to retrieve, using the discerner node, the interaction information associated with the one or more interactions executed by the first subset of nodes. In response, the system may be configured to determine, based on at least the interaction information, that the one or more interactions executed by the first subset of nodes meets one or more requirements (e.g., internal requirements and/or external requirements). In response, the system may be configured to transmit control signals configured to cause the user input device to display a confirmation notification indicating that the one or more interactions executed by the first subset of nodes meets the one or more requirements.

Figure 4:
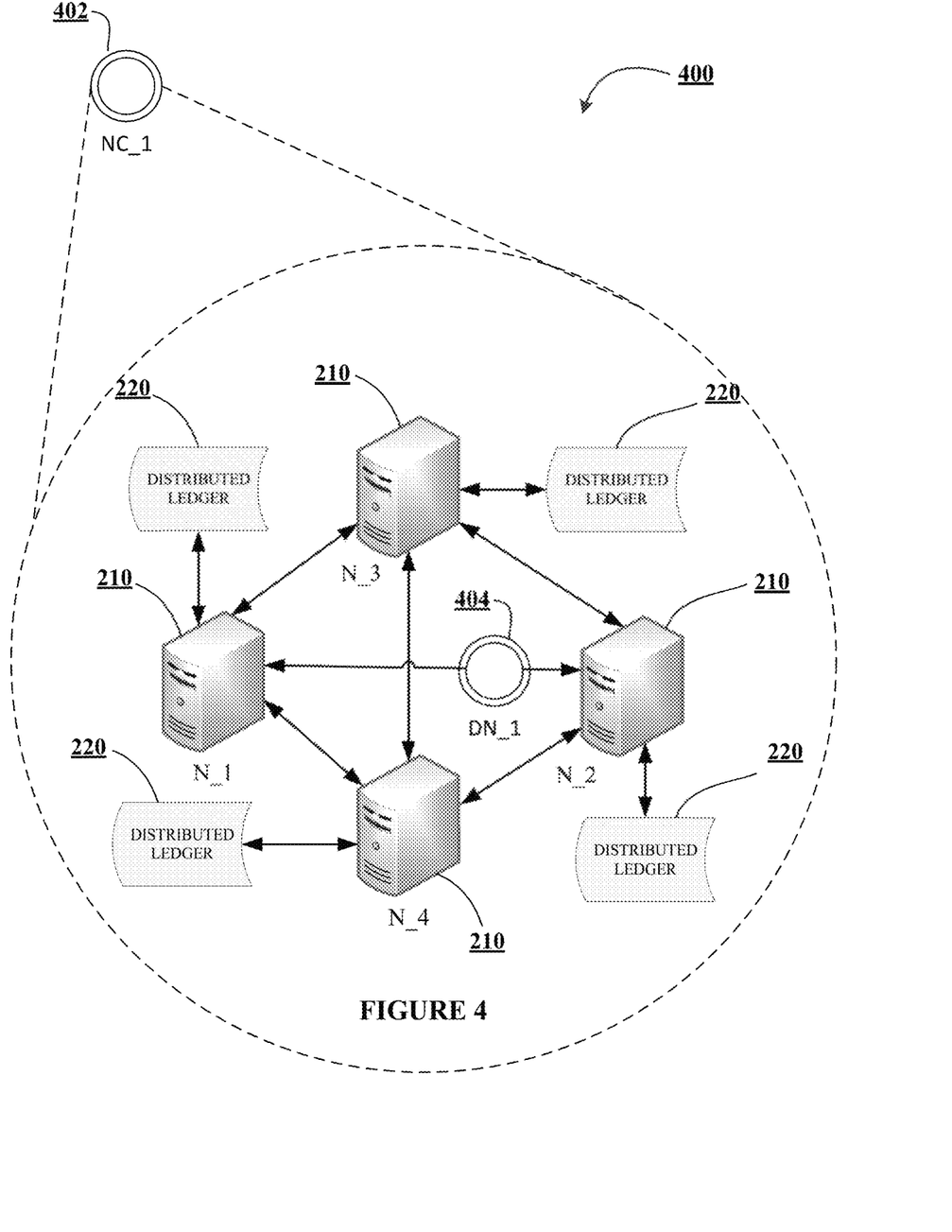
FIG. 4 illustrates a decentralized distributed network configuration with a deployed discerner node, in accordance with embodiments of the invention.

FIG. 4 illustrates a decentralized distributed network configuration with a deployed discerner node 400, in accordance with embodiments of the invention. As shown in FIG. 4, nodes N_1, N_2, N_3 and N_4 210 may interact with one another and the details of their interactions may be stored on the distributed ledger 220 that is maintained in a decentralized manner. As described herein, interactions are initiated at a node (N_1, N_2, N3, and/or N_4) of the distributed network and communicated to the various nodes of the distributed network. Any of the nodes can validate an interaction, add the transaction to its copy of the distributed ledger, and/or broadcast the interaction, its validation (in the form of a transaction object) and/or other data to other nodes.

As described herein, the system may be configured to deploy a node crawler NC_1 402 on the distributed network to determine, in part, whether the node-level interactions between the various nodes N_1 . . . N_4 are actively monitored and subsequently reported. In some embodiments, the system may be configured to determine that node-level interactions between nodes N_1 and N_2 have a monitoring status that does not meet the requisite security controls. For example, if the monitoring status is inactive, i.e., the node-level interactions are not monitored, then then the monitoring status does not meet the requisite security controls. In response, the system may be configured to generate a discerner node DN_1 404 to be deployed between at least the nodes N_1 and N_2 to actively monitor any node-level interactions between the two nodes.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for dynamic deployment of discerner nodes in a non-monitored distributed network, the system comprising:
    at least one non-transitory storage device; and
    at least one processor coupled to the at least one non-transitory storage device, wherein the at least one processor is configured to:
    electronically receive, from a user input device, a user input comprises instructions to deploy a node crawler on a distributed network, wherein the distributed network comprises one or more nodes;
    deploy the node crawler on the distributed network based on at least receiving the user input;
    determine, using the node crawler, node-level network behavior of the one or more nodes, wherein the node-level network behavior comprises at least a monitoring status of node-level interactions associated with the one or more nodes to determine whether monitoring protocols are implemented and are active in the distributed network;
    determine that the node-level behavior of a first subset of nodes do not meet one or more security controls;
    generate a discerner node based on at least the node-level network behavior of the one or more nodes to monitor and report node-level behaviors of the first subset of nodes; and
    deploy the discerner node on the first subset of nodes;
    determine a monitoring type associated with the monitoring status of the node-level interactions associated with a second subset nodes;
    determine that the monitoring type does not meet the one or more security controls; and
    deploy the discerner node on the second subset nodes.

2. The system of claim 1, wherein the at least one processor is further configured to:
    determine, using the node crawler, a structure of the distributed network; and
    generate the discerner node based on at least the structure of the distributed network.

3. The system of claim 1, wherein the monitoring status comprises at least active status or inactive status.

4. The system of claim 1, wherein the at least one processor is further configured to:
    continuously monitor, using the discerner node, one or more interactions executed by the first subset of nodes;

retrieve, using the discerner node, interaction information associated with the one or more interactions; and transmit control signals configured to cause a third party device to display the interaction information.

5. The system of claim 4, wherein the at least one processor is further configured to:

retrieve, using the discerner node, the interaction information associated with the one or more interactions executed by the first subset of nodes;

determine, based on at least the interaction information, that the one or more interactions executed by the first subset of nodes meets one or more requirements, wherein the one or more requirements comprises at least an internal requirement and an external requirement; and transmit control signals configured to cause the user input device to display a confirmation notification indicating that the one or more interactions executed by the first subset of nodes meets the one or more requirements.

6. A computer program product for dynamic deployment of discerner nodes in a non-monitored distributed network, the computer program product comprising a non-transitory computer-readable medium comprising code causing a first apparatus to:

electronically receive, from a user input device, a user input comprises instructions to deploy a node crawler on a distributed network, wherein the distributed network comprises one or more nodes;

deploy the node crawler on the distributed network based on at least receiving the user input;

determine, using the node crawler, node-level network behavior of the one or more nodes, wherein the node-level network behavior comprises at least a monitoring status of node-level interactions associated with the one or more nodes to determine whether monitoring protocols are implemented and are active in the distributed network;

determine that the node-level behavior of a first subset of nodes do not meet one or more security controls;

generate a discerner node based on at least the node-level network behavior of the one or more nodes to monitor and report node-level behaviors of the first subset of nodes; and deploy the discerner node on the first subset of nodes;

determine a monitoring type associated with the monitoring status of the node-level interactions associated with a second subset nodes;

determine that the monitoring type does not meet the one or more security controls; and deploy the discerner node on the second subset nodes.

7. The computer program product of claim 6, wherein the first apparatus is further configured to:

determine, using the node crawler, a structure of the distributed network; and generate the discerner node based on at least the structure of the distributed network.

8. The computer program product of claim 6, wherein monitoring status comprises at least active status or inactive status.

9. The computer program product of claim 6, wherein the first apparatus is further configured to:

continuously monitor, using the discerner node, one or more interactions executed by the first subset of nodes;

retrieve, using the discerner node, interaction information associated with the one or more interactions; and transmit control signals configured to cause a third party device to display the interaction information.

10. The computer program product of claim 9, wherein the first apparatus is further configured to:

retrieve, using the discerner node, the interaction information associated with the one or more interactions executed by the first subset of nodes;

determine, based on at least the interaction information, that the one or more interactions executed by the first subset of nodes meets one or more requirements, wherein the one or more requirements comprises at least an internal requirement and an external requirement; and transmit control signals configured to cause the user input device to display a confirmation notification indicating that the one or more interactions executed by the first subset of nodes meets the one or more requirements.

11. A method for dynamic deployment of discerner nodes in a non-monitored distributed network, the method comprising:

electronically receiving, from a user input device, a user input comprises instructions to deploy a node crawler on a distributed network, wherein the distributed network comprises one or more nodes;

deploying the node crawler on the distributed network based on at least receiving the user input;

determining, using the node crawler, node-level network behavior of the one or more nodes, wherein the node-level network behavior comprises at least a monitoring status of node-level interactions associated with the one or more nodes to determine whether monitoring protocols are implemented and are active in the distributed network;

determining that the node-level behavior of a first subset of nodes do not meet one or more security controls;

generating a discerner node based on at least the node-level network behavior of the one or more nodes to monitor and report node-level behaviors of the first subset of nodes;

deploying the discerner node on the first subset of nodes;

determining a monitoring type associated with the monitoring status of the node-level interactions associated with a second subset nodes;

determining that the monitoring type does not meet the one or more security controls; and deploying the discerner node on the second subset nodes.

12. The method of claim 11, wherein the method further comprises:

determining, using the node crawler, a structure of the distributed network; and generating the discerner node based on at least the structure of the distributed network.

13. The method of claim 11, wherein the monitoring status comprises at least active status or inactive status.

14. The method of claim 11, wherein the method further comprises:

continuously monitoring, using the discerner node, one or more interactions executed by the first subset of nodes;

retrieving, using the discerner node, interaction information associated with the one or more interactions; and transmitting control signals configured to cause a third party device to display the interaction information.

* * * * *